(12) United States Patent
Kodama et al.

(10) Patent No.: US 7,923,515 B2
(45) Date of Patent: Apr. 12, 2011

(54) DIP-FORMING COMPOSITION AND DIP-FORMED ARTICLE

(75) Inventors: Kazumi Kodama, Tokyo (JP); Kenji Arai, Kanagawa (JP); Tomomi Onitake, Tokyo (JP); Hisanori Ota, Kanagawa (JP)

(73) Assignee: Zeon Corporation, Tokyo (JP)

( * ) Notice: Subject to any disclaimer, the term of this patent is extended or adjusted under 35 U.S.C. 154(b) by 356 days.

(21) Appl. No.: 10/578,430

(22) PCT Filed: Nov. 18, 2004

(86) PCT No.: PCT/JP2004/017147
§ 371 (c)(1),
(2), (4) Date: May 5, 2006

(87) PCT Pub. No.: WO2005/049725
PCT Pub. Date: Jun. 2, 2005

(65) Prior Publication Data
US 2007/0082152 A1 Apr. 12, 2007

(30) Foreign Application Priority Data

Nov. 21, 2003 (JP) ................................. 2003-391914
Mar. 19, 2004 (JP) ................................. 2004-079607

(51) Int. Cl.
*C08C 19/00* (2006.01)
*C08C 19/04* (2006.01)
(52) U.S. Cl. ..................................... 525/332.5; 525/387
(58) Field of Classification Search ................ 525/332.5, 525/387
See application file for complete search history.

(56) References Cited

U.S. PATENT DOCUMENTS

| 5,399,400 | A  | * | 3/1995 | Nile et al. ..................... 428/36.8 |
| 7,183,347 | B2 | * | 2/2007 | Ota et al. ....................... 524/430 |
| 2003/0141633 | A1 |   | 7/2003 | McGlothlin et al. |
| 2003/0144400 | A1 | * | 7/2003 | Osen et al. ..................... 524/432 |
| 2007/0112141 | A1 | * | 5/2007 | Toya et al. ................... 525/329.1 |

FOREIGN PATENT DOCUMENTS

| DE | 40 37 814 A | 6/1991 |
| JP | 2003-165814 A | 6/2003 |
| JP | 2003-528229 A | 9/2003 |
| JP | 2003-530255 A | 10/2003 |
| WO | WO-98/54250 A1 | 12/1998 |
| WO | WO-01/72158 A1 | 10/2001 |
| WO | WO-01/77210 A2 | 10/2001 |

* cited by examiner

*Primary Examiner* — Ling-Siu Choi
*Assistant Examiner* — Hui Chin
(74) *Attorney, Agent, or Firm* — Birch, Stewart, Kolasch & Birch, LLP

(57) ABSTRACT

A dip-formed article that has wearing comfort, excelling in not only tensile strength but also flexing fatigue and that itself does not tend to suffer coloration even when the article is worn and operation is continued; and a dip-forming composition capable of providing such a dip-formed article. There is provided a dip-forming composition comprising a conjugated diene rubber latex and an organic peroxide, wherein providing that X refers to the 10-hr half-life temperature (° C.) of organic peroxide and Y refers to the octanol-water partition coefficient of organic peroxide, the organic peroxide satisfies the formulae: $11 \geq Y \geq 2$ (1), and $100-2Y \geq X \geq 70-2Y$ (2). There is further provided a dip-formed article obtained from the composition.

4 Claims, No Drawings

DIP-FORMING COMPOSITION AND DIP-FORMED ARTICLE

TECHNICAL FIELD

The present invention relates to a dip-forming composition and a dip-formed article.

BACKGROUND ART

Rubber gloves are widely utilized for home use, industrial use such as food industry and electronic device manufacturing, and medical use. It is required for rubber gloves to have various characteristics such that it should stretch by weaker force following movement of fingers so that hands do not become tired upon prolonged wearing (i.e., wearing comfort) and that it should not be broken during operation (i.e., sufficient tensile strength).

Further, particularly for thin rubber gloves, there has been sometimes a problem that crack occurs in crotch of fingers when one continues operation moving fingers with wearing them (i.e., low resistance to flexing fatigue).

Conventionally, as rubber gloves having high tensile strength and excellent oil resistance, there are often used those obtained by dip-forming of a dip-forming composition comprising carboxylated acrylonitrile-butadiene copolymer latex, sulfur and a curing accelerator.

For example, Patent document 1 discloses a dip-formed rubber glove from a dip-forming composition comprising a carboxylated acrylonitrile-butadiene rubber latex, zinc oxide, sulfur and a curing accelerator. Such a glove is very comfortable for wearing, but has poor tensile strength. So it is easy to be broken during wearing.

Further, Patent document 2 discloses a dip-formed glove from a dip-forming composition comprising a carboxylated acrylonitrile-butadiene copolymer latex, sulfur and a curing accelerator but not zinc oxide. Such a glove has high tensile strength, which reduces risk of breakage during wearing, but it is uncomfortable for wearing.

Further, Patent document 3 discloses a dip-formed rubber glove from a dip-forming composition comprising an acrylonitrile-butadiene copolymer latex containing a specific amount of carboxyl groups, a small amount of zinc oxide, a relatively large amount of sulfur and a curing accelerator. However, when one continues operation for a long time with wearing it, such a glove itself sometimes suffers coloration, which significantly lowers its commercial value.

In addition, the above-mentioned rubber glove manufactured by dip-forming of a dip-forming composition comprising sulfur and a curing accelerator as essential components, although relatively excellent in resistance to flexing fatigue, sometimes suffers coloration when one continues operation for a long time with wearing it, which significantly lowers its commercial value.

On the other hand, there has been also studied manufacturing of a dip-formed article where an organic peroxide is used as a crosslinker without using sulfur and a curing accelerator.

For example, Patent document 4 discloses a dip-formed article obtained by dip-forming of a dip-forming composition comprising a natural or synthetic rubber latex formulated with an organic peroxide such as dicumyl peroxide or di-t-butyl peroxide followed by crosslinking at a considerably high temperature in chemically inactive melted salt bath. However, such a rubber glove, although it has wearing comfort and sufficient tensile strength, has problems of coloration due to exposure to a high temperature during production and of low resistance to flexing fatigue causing crack in crotch of fingers in use for 2-3 hr.

Patent document 1: U.S. Pat. No. 5,014,362
Patent document 2: WO 97/48765
Patent document 3: WO 00/21451
Patent document 4: WO 01/77210

DISCLOSURE OF THE INVENTION

Problems to be Solved by the Invention

An object of the present invention is, based on the above-mentioned viewpoint, to provide a dip-formed article having wearing comfort, excellent tensile strength and high resistance to flexing fatigue and that itself does not tend to suffer coloration even when the article is worn and operation is continued; and a dip-forming composition capable of providing such a dip-formed article.

Means for Solving the Problems

The inventors of present invention pursued zealous studies paying attention to dip-formed articles obtained by using an organic peroxide as a crosslinker, and found that the above object can be achieved by using a dip-forming composition comprising a conjugated diene rubber latex and a specific organic peroxide. Base on this finding they completed the present invention.

Thus, the present invention provides a dip-forming composition comprising a conjugated diene rubber latex and an organic peroxide, wherein the organic peroxide satisfies the following formulae (1) and (2), provided that X refers to the 10-hr half-life temperature (° C.) of the organic peroxide and Y refers to the octanol-water partition coefficient of the organic peroxide:

$$11 \geq Y \geq 2 \tag{1}$$

$$100 - 2Y \geq X \geq 70 - 2Y \tag{2}$$

Further the present invention provides a dip-formed article obtained by dip-forming of the above-mentioned dip-forming composition.

Advantageous Effect of the Invention

The present invention provides a dip-formed article having wearing comfort, excellent tensile strength and high resistance to flexing fatigue and that itself does not tend to suffer coloration even when the article is worn and operation is continued; and a dip-forming composition capable of providing such a dip-formed article.

BEST MODE FOR CARRYING OUT THE INVENTION

The present invention will be explained in detail below.
A dip-forming composition of the present invention comprises a conjugated diene rubber latex and a specific organic peroxide.

(Conjugated Diene Rubber Latex)

Conjugated diene rubber latex used in the present invention is not particularly limited as long as it contains conjugated diene monomer units. For example, there may be mentioned a natural rubber latex and a synthetic rubber latex obtained by emulsion polymerization of a monomeric mixture essentially comprising a conjugated diene monomer. Among them, a synthetic rubber latex is used preferably because various characteristics of the dip-formed product can be adjusted arbitrarily. A preferred synthetic rubber latex is a conjugated diene rubber latex obtained by emulsion polymerization of a monomeric mixture comprising a conjugated diene monomer, an ethylenically unsaturated acid monomer and another monomer capable of copolymerization with them. Essential use of an ethylenically unsaturated acid monomer provides a dip-formed article excellent in tensile strength.

As a conjugated diene monomer, for example, there may be mentioned 1,3-butadiene, isoprene, 2,3-dimethyl-1,3-butadiene, 2-ethyl-1,3-butadiene, 1,3-pentadiene, chloroprene and the like. In particular, 1,3-butadiene and isoprene are preferred, and 1,3-butadiene is more preferred. These conjugated diene monomers can be used alone or in a combination of two or more.

The amount of the conjugated diene monomer is preferably 30-90 wt %, more preferably 50-84 wt %, especially preferably 55-81 wt % of total monomers. Too small amounts tend to give articles with poor feel, whereas too large amounts tend to give those with low tensile strength.

As an ethylenically unsaturated acid monomer, for example, there may be mentioned an ethylenically unsaturated monomer containing carboxyl group, an ethylenically unsaturated monomer containing sulfonic acid group, an ethylenically unsaturated monomer containing phosphoric acid group and the like.

As an ethylenically unsaturated monomer containing carboxyl group, for example, there may be mentioned ethylenically unsaturated monocarboxylic acid such as acrylic acid, methacrylic acid, crotonic acid and the like; ethylenically unsaturated polycarboxylic acid or its anhydride such as fumaric acid, maleic acid, itaconic acid, maleic anhydride, itaconic anhydride and the like; and partial ester of ethylenically unsaturated polycarboxylic acid such as methyl malate, methyl itaconate and the like.

As an ethylenically unsaturated monomer containing sulfonic acid group, for example, there may be mentioned vinylsulfonic acid, methylvinylsulfonic acid, styrenesulfonic acid, (meth) allylsulfonic acid, 2-sulfonylethyl (meth)acrylate, 2-acrylamido-2-hydroxypropanesulfonic acid and the like.

As an ethylenically unsaturated monomer containing phosphoric acid group(s), there may be mentioned 3-chloro-2-propylphosphoryl(meth)acrylic acid, 2-ethylphosphoryl (meth)acrylic acid, 3-allyloxy-2-hydroxypropanephosphoric acid and the like.

These ethylenically unsaturated acid monomers can be used as alkali metal salts or ammonium salts, and can be used alone or in a combination of two or more.

Among the above-mentioned ethylenically unsaturated acid monomers, ethylenically unsaturated monomers containing carboxyl group(s) are preferred. Ethylenically unsaturated monocarboxylic acids are more preferred, and methacrylic acid is especially preferred.

The amount of an ethylenically unsaturated acid monomer is preferably 0.5-10 wt %, more preferably 1-9 wt %, and especially preferably 2-8 wt % of total monomers. Too small amounts tend to give articles with low tensile strength, whereas too large amounts tend to give those with poor feel.

As another monomer capable of copolymerization with the conjugated diene monomer and the ethylenically unsaturated acid monomer, although not particularly limited, for example, there may be mentioned aromatic vinyl monomers such as styrene, α-methylstyrene, monochlorostyrene, dichlorostyrene, trichlorostyrene, monomethylstyrene, dimethylstyrene, trimethylstyrene, hydroxymethylstyrene and the like; ethylenically unsaturated nitrile monomers such as acrylonitrile, methacrylonitrile, 2-chloropropenenitrile, 2-butenenitrile and the like; ethylenically unsaturated carboxamide monomers such as acrylamide, methacrylamide, N,N-dimethylacrylamide, N-methylolacrylamide and the like; ethylenically unsaturated carboxylic acid alkyl ester monomers such as methyl (meth)acrylate, ethyl (meth)acrylate, butyl (meth)acrylate, 2-ethylhexyl (meth)acrylate and the like; vinyl carboxylate monomers such as vinyl acetate, vinyl propionate, vinyl barthatate and the like; halogenated vinyl monomers such as vinyl chloride, chlorovinylidene, vinyl fluoride, fluorovinylidene and the like; olefin monomers such as ethylene, propylene, 1-butene, isobutene and the like; vinyl ether monomers such as methyl vinyl ether, n-propyl vinyl ether, isobutyl vinyl ether, dodecyl vinyl ether and the like; (meth)allyl compounds such as allyl acetate, methallyl acetate, allyl chloride, methallyl chloride and the like; vinylsilyl compounds such as trimethoxyvinylsilane; vinylpyridine; and N-vinylpyrrolidone and the like. These can be used alone or in a combination of two or more.

Among these other monomers, aromatic vinyl monomers, ethylenically unsaturated nitrile monomers and ethylenically unsaturated carboxylic acid alkyl ester monomers are preferably used. On the point that they provide dip-formed articles having high tensile strength, aromatic monomers and ethylenically unsaturated nitrile monomers are preferred. Furthermore, on the point that they provide dip-formed article excellent in oil resistance, ethylenically unsaturated nitrile monomers are more preferred.

The amount of the above-mentioned other monomer is preferably 0-69.5 wt %, more preferably 7-49 wt %, and especially preferably 11-43 wt % of total monomers. Within this range, tensile strength, oil resistance and feel of articles are well maintained.

Synthetic rubber latex usable in the present invention is obtained by emulsion polymerization of the above-mentioned monomeric mixture. As a method of emulsion polymerization, methods known in the art can be used without particular limitation.

On emulsion polymerization of the above-mentioned monomeric mixture, auxiliary agents for polymerization such as emulsifiers, initiators and molecular weight modifiers usually employed can be used. The manner in which these auxiliary agents are added is not particularly limited. They may be added initially at once, portionwise or continuously.

As an emulsifier, although not particularly limited, for example, there may be mentioned anionic emulsifiers such as alkylbenzenesulfonates, aliphatic sulfonates, salts of sulfate esters of higher alcohols and the like; non-ionic emulsifier such as alkyl ethers of polyethyleneglycol, alkyl esters of polyethyleneglycol, alkylphenyl ethers of polyethyleneglycol and the like; amphoteric emulsifiers containing carboxylate, sulfate ester, sulfonate, phosphate or phosphate ester as an anionic moiety and amine salts or quaternary ammonium as a cationic moiety. In particular, anionic emulsifiers are preferably used.

The amount of emulsifier is usually 0.5-10 parts by weight, preferably 1-8 parts by weight and more preferably 2-5 parts by weight based on 100 parts by weight of total monomers.

As an initiator, although not particularly limited, for example, there may be mentioned inorganic peroxides such as sodium persulfate, potassium persulfate, ammonium persulfate, potassium perphosphate, hydrogen peroxide and the like; organic peroxides such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethylhexanoyl peroxide, t-butyl peroxyisobutyrate and the like;

azo compounds such as azobisisobutyronitrile, azobis-2,4-dimethylvaleronitrile, azobiscyclohexanecarbonitrile, dimethyl azobisisobutyrate and the like. These initiators can be used alone or in a combination of two or more. The peroxide can also be used as a redox initiator together with a reducing agent such as sodium bisulfite. As an initiator, inorganic or organic peroxides are preferably used. Inorganic peroxides are more preferred, and persulfates are especially preferred.

The amount of initiator is usually 0.01-2 parts by weight, preferably 0.05-1.5 parts by weight based on 100 parts by weight of total monomer.

As a molecular weight modifier, although not particularly limited, for example, there may be mentioned α-methylstyrene dimer; mercaptans such as t-dodecylmercaptan, n-dodecylmercaptan, octylmercaptan and the like; halogenated hydrocarbons such as carbon tetrachloride, methylene chloride, methylene bromide and the like; and sulfur-containing compounds such as tetraethylthiuram disulfide, dipentamethylenethiuram disulfide, diisopropylxanthogene disulfide and the like. These can be used alone or in a combination of two or more. In particular, mercaptans are preferably used, and t-dodecylmercaptan is especially preferred.

Preferable amount of the molecular weight modifier is, although depending on the kind of modifier, 0.1-0.8 part by weight based on 100 parts by weight of total monomers. A range of 0.2-0.7 part by weight is more preferred.

As a manner in which monomers are charged, for example, there may be mentioned a manner in which monomers to be reacted are charged into a reactor at once, a manner in which they are added continuously or stepwise as polymerization progresses, a manner in which a part of monomers are charged and reacted up to a specific conversion and then the remaining monomers are continuously or stepwise added for further polymerization and the like, and any manner can be employed. When a monomeric mixture is continuously or stepwise added, the composition of mixture may be constant or varied.

Also, each monomer can be charged into a reactor either by pre-mixing monomers to be used or separately.

Emulsion polymerization is usually carried out in water. The amount of water for emulsion polymerization, is usually 80-500 parts by weight, preferably 100-200 parts by weight based on 100 parts by weight of total monomers.

Furthermore, if necessary, auxiliary agents such as chelator, dispersant, pH regulator, deoxidant, particle size modifier and the like can be used. The identity and amount of auxiliary agents are not limited.

The polymerization temperature is, although not particularly limited, usually 0-95° C., preferably 5-70° C.

When a monomeric mixture is subjected to emulsion polymerization and the pre-determined conversion is reached, polymerization reaction is terminated by cooling the system or adding a terminator. The conversion at which polymerization is terminated is preferably 90 wt % or higher, more preferably 93 wt % or higher.

After polymerization is terminated, if desired, unreacted monomers are removed and the solid content and the pH value are adjusted to obtain synthetic rubber latex.

To conjugated diene rubber latex used in the present invention, if necessary, an anti-oxidant, a preservative, an anti-bacterial agent, a dispersant, a UV absorber, a pH regulator or the like can be added.

(Organic Peroxide)

The present invention is characterized by using an organic peroxide, wherein the organic peroxide satisfies the following formulae (1) and (2), provided that X refers to its 10-hr half-life temperature (° C.) and Y refers to its octanol-water partition coefficient.

$$11 \geq Y \geq 2 \tag{1}$$

$$100 - 2Y \geq X \geq 70 - 2Y \tag{2}$$

Among such organic peroxides, those satisfying the following formulae (3) and (4) are preferred, and those satisfying the following formulae (5) and (6) are more preferred.

$$10 \geq Y \geq 2 \tag{3}$$

$$95 - 2Y \geq X \geq 72 - 2Y \tag{4}$$

$$7 \geq X \geq 2 \tag{5}$$

$$88 - 2Y \geq X \geq 74 - 2Y \tag{6}$$

If an organic peroxide that does not satisfy the above criteria is used, effects of the present invention cannot be obtained.

The 10-hr half-life temperature (° C.) refers to the temperature at which the organic peroxide reduces to half of its initial amount at 10 hr due to thermal decomposition.

A lower value of this temperature means that it is easier to decompose, whereas a higher value means higher resistance to decomposition.

The octanol-water partition coefficient is, provided that Co (μg/ml) refers the concentration of a compound dissolved in 1-octanol and Cw (μg/ml) refers to the concentration of the same compound dissolved in water, a value calculated as log (Co/Cw) and represents the hydrophilicity-hydrophobicity balance of the compound.

In addition, octanol-water partition coefficients used in the present invention are values calculated based on the structure of organic peroxide with the software ACD/Log P DB (version 6.00; Advanced Chemistry Development, Inc.).

Specific examples of organic peroxides used in the present invention are listed below. The 10-hr half-life temperature (X: ° C.) and octanol-water partition coefficient (Y) for each compound are shown in parentheses.

Dibenzoyl peroxide (X=73.6, Y=3.46)
Benzoyl (3-methylbenzoyl) peroxide (X=73.1, Y=3.93)
Di-n-octanoyl peroxide (X=61.5, Y=6.34)
1,1,3,3-Tetramethylbutylperoxy-2-ethylhexanoate (X=65.3, Y=6.34)
t-Hexylperoxy-2-ethylhexanoate (X=69.9, Y=5.65)
Di(4-methylbenzoyl) peroxide (X=70.6, Y=4.39)
t-Butylperoxy-2-ethylhexanoate (X=72.1, Y=4.59)
t-Butylperoxyisobutyrate (X=77.3, Y=2.46)
1,1-Di(t-butylperoxy)-2-methylcyclohexane (X=83.2, Y=5.88)
Di(3,5,5-trimethylhexaonyl) peroxide (X=59.4, Y=6.31)
2,5-Dimethyl-2,5-di(2-ethylhexanoylperoxy)hexane (X=66.2, Y=8.87)
Dilauroyl peroxide (X=61.6, Y=10.6)

On the point that it provides dip-formed articles with well-balanced properties, dibenzoyl peroxide is preferably used as an organic peroxide.

As an organic peroxide that does not satisfy the above criteria, for example, there may be mentioned dicumyl peroxide (X=116.4, Y=5.71), di-t-butyl peroxide (X=123.7, Y=3.19) and the like.

(Dip-Forming Compositions)

A dip-forming composition of the present invention comprises the above-mentioned conjugated diene rubber latex and the above-mentioned organic peroxide.

The content of organic peroxide is preferably 0.01-5 parts by weight, more preferably 0.05-3 parts by weight, and especially preferably 0.1-2 parts by weight based on 100 parts by weight of solids content in the above-mentioned conjugated diene rubber latex. Too small amounts tend to give articles with poor resistance to flexing fatigue, whereas too large amounts tend to give those inferior in feel or tensile strength.

As a method of adding organic peroxide to conjugated diene rubber latex, although not particularly limited, for example, there may be mentioned (1) a method where a powdery or liquid organic peroxide is added to a conjugated diene rubber latex, (2) a method where organic solution dissolving an organic peroxide is added to a conjugated diene rubber latex, (3) a method where organic solution dissolving an organic peroxide is emulsified in water using an emulsifier and the emulsion is added to a conjugated diene rubber latex, and the like. Further, an organic peroxide may be mixed with an inorganic filler to form powder, prior to use, for a purpose of easy handling.

An organic solvent that dissolves the above-mentioned organic peroxide is not particularly limited, as long as it can dissolve the organic peroxide. For example, there may be mentioned organic solvents with boiling point lower than 200° C. such as acetone, tetrahydrofuran, dioxane, diethyl ether, ethyl acetate, hexane, cyclohexane, benzene, toluene and the like; and organic solvents with boiling point of 200° C. or higher such as dimethyl phthalate, diethyl phthalate, dibutyl phthalate, di(2-ethylhexyl) phthalate, di-n-octyl phthalate, diisooctyl phthalate, diisodecyl phthalate, ditridecyl phthalate, diisononyl phthalate, dimethyl isophthalate, di(2-ethylhexyl) tetrahydrophthalate, dibutyl adipate, dimethyl adipate, di(2-ethylhexyl) adipate, diisobutyl adipate, diisodecyl adipate, di-n-octyl adipate, di-n-decyl adipate, diisononyl adipate, dibutyldiglycol adipate, di(butoxyethoxyethyl) adipate, di(2-ethylhexyl) azelate, di-n-hexyl azelate, tri(2-ethylhexyl) trimellitate, tri-n-octyl trimellitate, triisooctyl trimellitate, glyceryl monooleate, methyl acetylricinolate, butyl acetylricinolate, n-butyl stearate, triethyl phosphate, tributyl phosphate, tri(2-ethylhexyl) phosphate, 2-ethylhexyl diphenyl phosphate, tributoxyethyl phosphate, triphenyl phosphate and the like.

Furthermore, when an organic peroxide is to be dissolved in an organic solvent, the organic solvent can be dissolved by warming in a temperature range wherein it is not rapidly decomposed.

The concentration of organic peroxide dissolved in an organic solvent is, although not particularly limited, usually 5-60 wt %, and preferably 8-50 wt %. When the concentration is too low, the organic solvent tends to be difficult to remove from the dip-formed article or tends to largely remain in the article, lowering its tensile strength. Conversely, when the concentration is too high, the preparation of the solution becomes difficult.

On addition of an organic peroxide, the pH value of conjugated diene rubber latex is preferably 8.5 or higher. A preferred range is 9 to 11. This pH range is preferred on the point that formation of large agglomerate can be prevented.

Because the dip-forming composition of present invention comprises an organic peroxide as a crosslinker, when conventionally used sulfur and/or a curing accelerator are added to the composition, the balance among physical properties of the obtained dip-formed articles tend to worsen.

Accordingly, sulfur loading is preferably 0.5 part or less by weight based on 100 parts by weight of solids content in the above-mentioned conjugated diene rubber latex, and more preferably 0.3 part or less by weight.

Further, loading of a curing accelerator is preferably 0.3 part or less by weight, more preferably 0.1 part or less by weight based on 100 parts by weight of solids content in the above-mentioned conjugated diene rubber latex. Considering the balance among physical properties of dip-formed articles, it is most preferred that neither sulfur nor curing accelerator is added.

To the dip-forming composition of present invention, zinc oxide can be added if it does not substantially interfere effects of the present invention. The loading of zinc oxide is preferably 2 parts or less by weight, more preferably 1 part or less by weight and especially preferably 0.6 part or less by weight based on 100 parts by weight of solids content in the above-mentioned conjugated diene rubber latex.

When an organic peroxide is dissolved in an organic solvent with boiling point of 200° C. or higher and added to a dip-forming composition, the solvent tends to remain in the dip-formed articles obtained, lowering their tensile strength. In this case, if zinc oxide is added at preferably 0.1-1 part by weight, more preferably 0.2-0.6 part by weight based on 100 parts by weight of solids content in the above-mentioned conjugated diene rubber latex, dip-formed articles excellent in balance of feel and tensile strength are obtained, although the content of the organic solvent with a boiling point of 200° C. or higher also influences the properties.

To the dip-forming composition of present invention, there may properly be added conventional additives such as inorganic pigment, colorant, dispersant, pH regulator, wetting agents, preservatives, anti-bacterial agents, wax, sizing agent and the like.

The concentration of solids content in dip-forming composition is preferably 20-40 wt %, more preferably 25-35 wt %.

The pH value of dip-forming composition is preferably 8.5 or higher, more preferably between 9 and 11.

When a dip-forming composition with the above-mentioned solid content and pH value is used, a dip-formed article with uniform film thickness is readily manufactured.

(Dip-Formed Articles)

The Dip-formed article of present invention is obtained by dip-forming of the above-mentioned dip-forming composition.

As a method of dip-forming, there may be used methods known in the art such as direct dipping method, anode coagulant dipping method, teague coagulant dipping method and the like. In particular, anode coagulant dipping method is preferred on the point that it readily provides articles with uniform thickness.

In anode coagulant dipping method, for example, a dip-forming mold is dipped in a coagulant solution so that the coagulant adheres to its surface, and then the mold is dipped in a dip-forming composition to form a dip-formed rubber layer thereon.

As a dip-forming mold, there may be used various molds such as those made of ceramics, glass, metal, plastics or the like. Shape of mold corresponds to the shape of dip-formed article, which is a final product. When the dip-formed article is a glove, the dip-forming mold may have various shapes such as one from a wrist to fingertips, one from an elbow to fingertips and the like. Furthermore, the surface of the dip-forming mold may be surface-treated such as glossing, semi-glossing, non-glossing, fabric patterning and the like on the whole or partially.

As a coagulant, there may be mentioned, for example, metal halides such as barium chloride, calcium chloride, magnesium chloride, zinc chloride, aluminium chloride and the like; nitrates such as barium nitrate, calcium nitrate, zinc nitrate and the like; acetates such as barium acetate, calcium acetate, zinc acetate and the like; and sulfates such as calcium sulfate, magnesium sulfate, aluminium sulfate and the like. In particular, calcium chloride and calcium nitrate are preferred.

The coagulant is usually used as a solution in water, alcohol or a mixture thereof. The concentration of coagulant is usually 5-70 wt %, preferably 10-50 wt %.

The dip-formed rubber layer obtained is usually crosslinked by heat treatment (crosslinking step).

Before heat treatment, the dip-formed rubber layer may be dipped in water, preferably warm water at a temperature of 30-70° C., for 1-60 min to remove water-soluble impurities (for example, excessive emulsifying agent, coagulant or the like). This step may be performed after heat treatment, but it is preferred to perform before heat treatment since water-soluble impurities are more efficiently removed.

The dip-formed rubber layer thus obtained is heat-treated at 70-150° C., preferably 80-140° C., for 5-120 min for crosslinking.

If the dip-formed rubber layer contains a large amount of water, a drying step at 40-100° C. for 5-60 min is optionally added before the crosslinking step.

As a method of heat treatment, external heating with infrared radiation or hot air and internal heating with high-frequency heating can be used. In particular, heating with hot air is preferred.

By removing the crosslinked dip-formed rubber layer from the dip-forming mold, a dip-formed article is obtained. Here, the layer may be stripped from the mold by hand or by using hydraulic pressure or compressed air.

After removing, the layer may be further heat-treated at 60-120° C. for 10-120 min (post-crosslinking step).

Dip-formed articles may have a surface-treated layer formed by chlorination, coating or the like on its inside and/or outside surfaces.

The thickness of dip-formed article of present invention is about 0.1 to about 3 mm. In particular, it is preferably used in thin articles of 0.1-0.3 mm in thickness. As specific application, there may be mentioned medical goods such as nipples, droppers, catheter, water pillows and the like; toys or sport goods such as balloons, dolls, balls and the like; industrial articles such as pressure-molding bag, gas-storage bag and the like; gloves for surgery use, home use, agricultural use, fishery use or industrial use; and finger cots and the like. The gloves may be supported-type or unsupported-type. Among these, the articles are suitable for thin surgery gloves.

EXAMPLES

The present invention is further illustrated by the following example and comparative examples, however the present invention is not limited to these examples. In these examples, part and % represent based on weight unless otherwise specified.

Production Example 1

Production of NBR Latex

Into a polymerization reactor were charged 28 parts of acrylonitrile, 66 parts of 1,3-butadiene, 6 parts of methacrylic acid, 0.3 part of t-dodecylmercaptan, 132 parts of ion-exchanged water, 3 parts of sodium dodecylbenzenesulfonate, 0.5 part of sodium salt of β-naphthalenesulfonic acid-formalin condensate, 0.3 part of potassium persulfate and 0.05 part of sodium ethylenediaminetetraacetate. Polymerization was started with a polymerization temperature kept at 37° C.

At 60% conversion, 0.15 part of t-dodecylmercaptan was added, and the temperature was raised to 40° C. At 80% conversion, 0.15 part of t-dodecylmercaptan was added, polymerization was continued up to 94% conversion, and then polymerization was terminated by adding 0.1 part of sodium dimethyldithiocarbamate as a terminator.

After removal of unreacted monomers from the copolymer latex obtained, its pH value and solid content were adjusted to prepare conjugated diene rubber latex A with solids concentration of 40% and pH value of 8.

Production Example 2

Production of SBR Latex

Into a polymerization reactor were charged 42 parts of styrene, 54 parts of 1,3-butadiene, 4 parts of methacrylic acid, 0.3 part of t-dodecylmercaptan, 132 parts of ion-exchanged water, 3 parts of sodium dodecylbenzenesulfonate, 0.5 part of sodium salt of β-naphthalenesulfonic acid-formalin condensate, 0.3 part of potassium persulfate and 0.05 part of sodium ethylenediaminetetraacetate. Polymerization was started with a polymerization temperature kept at 60° C.

At 60% conversion, 0.15 part of t-dodecylmercaptan was added and the temperature was raised to 70° C. At 80% conversion, 0.15 part of t-dodecylmercaptan was added, polymerization was continued up to 95% conversion, and then polymerization was terminated by adding 0.1 part of sodium dimethyldithiocarbamate as a terminator.

After removal of unreacted monomers from the copolymer latex obtained, its pH value and solid content were adjusted to prepare conjugated diene rubber latex B with solids concentration of 40% and pH value of 8.

Example 1

In 10 parts of toluene was dissolved 5 parts of dibenzoyl peroxide at 45° C. To this solution, 15 parts of 1.7% aqueous solution of sodium dodecylbenzenesulfonate was added to obtain emulsion of dibenzoyl peroxide.

To conjugated diene rubber latex A, 5% aqueous solution of potassium hydroxide was added to adjust the pH to 10. The above emulsion was added to the latex at 45° C. so that the amount of dibenzoyl peroxide became 1 part based on 100 parts of the solids content in the latex. Further ion-exchanged water was added to obtain a dip-forming composition with solids concentration of 30% and pH value of 10.

In an aqueous coagulant solution prepared by mixing 20 parts of calcium nitrate, 0.05 part of polyoxyethylene octyl phenyl ether, which is a non-ionic emulsifier, and 80 parts of water, a glove-mold was dipped for 5 seconds, drawn out and dried at 50° C. for 10 min to adhere the coagulant to the glove-mold.

Next, the glove-mold with the coagulant adhered was dipped in the above-mentioned dip-forming composition for 6 seconds, drawn out, dried at 50° C. for 10 min, and dipped in warm water at 40° C. for 3 min to leach out water-soluble impurities.

Then, the glove-mold was dried at 70° C. for 10 min followed by heat-treatment at 120° C. for 20 min to crosslink the dip-formed rubber layer. Finally, the crosslinked dip-formed rubber layer was stripped off the glove-mold to obtain a rubber glove of 0.1 mm in thickness.

Properties of the glove obtained were evaluated by the following methods. The results are shown in Table 1.

(Feel, Tensile Strength and Elongation)

Dumbbell-shaped specimens were prepared from the gloves obtained by using small modified dumbbell #2.

The above-mentioned specimen was pulled at a pulling speed of 500 mm/min to measure a tensile strength when the elongation reaches 300% (Md300%; MPa), a tensile strength at break (MPa) and an elongation (%) at break.

The smaller Md300% value means the better feel.

(Resistance to Flexing Fatigue)

Ten testers wore the gloves obtained and performed light work.

Every 1 hr after wearing the gloves, occurrence of crack was examined visually at the crotches of fingers of gloves.

The time when crack occurred was determined for each glove worn by the testers, and the arithmetic mean was calculated excluding the shortest and the longest values. This wearing test was done for a maximum of 6 hr.

The longer duration represents the higher resistance to flexing fatigue.

(Color Change by Cupric Ion)

The glove obtained was dipped in 3% aqueous solution of copper sulfate for 30 seconds, and the degree of color change at 1 hr was examined by visual observation and the result was represented as follows.

The rubber glove did not change in color: A

The rubber glove changed in color: B

A rubber glove that changes in color in the above-mentioned test itself tends to suffer coloration in long-term use.

Example 2

Except that the amount of dibenzoyl peroxide added was changed to 0.5 part based on 100 parts of the solids content in latex, a rubber glove was obtained by the same procedures as Example 1.

Example 3

To conjugated diene rubber latex A, 5% aqueous solution of potassium hydroxide was added to adjust the pH value to 10, and here ion-exchanged water was added to adjust the solid content to 30%. To 100 parts of solids content in this latex 1 part of dibenzoyl peroxide was added to obtain a dip-forming composition.

With use of this dip-forming composition, a rubber glove was obtained by the same procedures as Example 1 except that the crosslinking was performed at 120° C. for 30 min.

Properties of this glove were evaluated and the results are shown in Table 1.

Example 4

With use of conjugated diene rubber latex B instead of conjugated diene rubber latex A, a rubber glove was obtained by the same procedures as Example 1 except that the crosslinking was performed at 120° C. for 30 min.

Properties of this glove were evaluated and the results are shown in Table 1.

Comparative Example 1

Except that dicumyl peroxide was used instead of dibenzoyl peroxide, a rubber glove was obtained by the same procedures as Example 1.

Properties of this glove were evaluated and the results are shown in Table 1.

Comparative Example 2

Except that disuccinic acid peroxide was used instead of dibenzoyl peroxide, a rubber glove was obtained by the same procedures as Example 1.

Properties of this glove were evaluated and the results are shown in Table 1.

Comparative Example 3

Except that 2,4-dichlorobenzoyl peroxide was used instead of dibenzoyl peroxide, a rubber glove was obtained by the same procedures as Example 1.

Properties of this glove were evaluated and the results are shown in Table 1.

Comparative Example 4

1.5 Parts of sulfur, 1 part of zinc dibutyldithiocarbamate, 1 part of zinc oxide, 1.5 parts of titanium oxide, 0.03 part of potassium hydroxide and 5.03 part of water were mixed to prepare 10.06 parts of a curing solution with solids concentration of 50%.

10.06 Parts of the above-mentioned curing solution was added to conjugated diene rubber latex A based on 100 parts of its solids content, and then 5% aqueous potassium hydroxide solution and ion-exchanged water were added to obtain a dip-forming composition with pH value of 10 and solids concentration of 30%.

Except that the above dip-forming composition was used, a rubber glove was obtained by the same procedures as Example 1.

Properties of this glove were evaluated and the results are shown in Table 1.

TABLE 1

|  | Example | | | | Comparative example | | | |
| --- | --- | --- | --- | --- | --- | --- | --- | --- |
|  | 1 | 2 | 3 | 4 | 1 | 2 | 3 | 4 |
| Formulated composition (part) | | | | | | | | |
| Conjugated diene rubber latex | A | A | A | B | A | A | A | A |
| Solids content in latex | 100 | 100 | 100 | 100 | 100 | 100 | 100 | 100 |
| Organic peroxide | | | | | | | | |
| dibenzoyl peroxide | 1 | 0.5 | 1 | 1 | — | — | — | — |
| dicumyl peroxide | — | — | — | — | 1 | — | — | — |
| disuccinic acid peroxide | — | — | — | — | — | 1 | — | — |
| 2,4-dichlorobenzoyl peroxide | — | — | — | — | — | — | 1 | — |
| Sulfur | — | — | — | — | — | — | — | 1.5 |
| Curing accelerator | — | — | — | — | — | — | — | 1 |

TABLE 1-continued

|  | Example | | | | Comparative example | | | |
| --- | --- | --- | --- | --- | --- | --- | --- | --- |
|  | 1 | 2 | 3 | 4 | 1 | 2 | 3 | 4 |
| Zinc oxide | — | — | — | — | — | — | — | 1 |
| Titanium oxide | — | — | — | — | — | — | — | 1.5 |
| Properties of organic peroxide | | | | | | | | |
| 10-hr half-life temperature(° C.) | 73.6 | 73.6 | 73.6 | 73.6 | 116.4 | 65.9 | 52.8 | — |
| Octanol-water partition coefficient | 3.46 | 3.46 | 3.46 | 3.46 | 5.72 | −0.42 | 5.37 | — |
| Properties of dip-formed article | | | | | | | | |
| 300% Md (MPa) | 2.3 | 2.2 | 2.4 | 3.1 | 2.1 | 2.4 | 2.2 | 6.1 |
| Tensile strength (MPa) | 27 | 26 | 30 | 24 | 28 | 29 | 28 | 27 |
| Elongation (%) | 660 | 650 | 670 | 520 | 660 | 640 | 650 | 530 |
| Color change by cupric ion | A | A | A | A | A | A | A | B |
| Resistance to flexing fatigue (hr) | ≧6 | ≧6 | ≧6 | ≧6 | 2.5 | 2 | 2.5 | ≧6 |

Table 1 indicates the followings.

A rubber latex obtained by using an organic peroxide that does not satisfy the criteria defined in the present invention is poor in resistant to flexing fatigue and crack occurs at the crotch of fingers for 2-3 hr in use (Comparative examples 1-3).

A rubber glove obtained from dip-formed composition comprising sulfur, a curing accelerator and zinc oxide has poor feel and itself tends to suffer coloration when it is worn and operation is continued (Comparative example 4).

In contrast to these comparative examples, a rubber glove obtained from the dip-forming composition of present invention has wearing comfort, excellent tensile strength and high resistance to flexing fatigue, and the glove itself does not suffer coloration during continuous operation with wearing it (Examples 1-4).

Example 5

In 43 parts of dibutyl phthalate, 5 parts of dibenzoyl peroxide was dissolved at 45° C. To this solution, 48 parts of 1.7% aqueous solution of sodium dodecylbenzenesulfonate was added to obtain emulsion of dibenzoyl peroxide.

To conjugated diene rubber latex A, 5% aqueous solution of potassium hydroxide was added to adjust the pH to 10. The above-mentioned emulsion was added to this latex at 45° C. so that the amount of dibenzoyl peroxide became 0.5 part based on 100 parts of the solids content in the latex, and ion-exchanged water was further added to obtain a dip-forming composition with solids concentration of 30% and pH 10.

Except that the above dip-forming composition was used, a rubber glove was obtained by the same procedures as Example 1. Properties of this glove were measured and the results are shown in Table 2.

Example 6

In 21 parts of dibutyldiglycol adipate, 3 parts of dibenzoyl peroxide was dissolved at 45° C. To this solution, 24 parts of 1.7% aqueous solution of sodium dodecylbenzenesulfonate was added with stirring to obtain emulsion of dibenzoyl peroxide.

5 Parts of zinc oxide was dispersed in 5 parts of ion-exchanged water to obtain an aqueous dispersion of zinc oxide.

To conjugated diene rubber latex A, 5% aqueous solution of potassium hydroxide was added to adjust the pH to 10. To this latex the above-mentioned emulsion and the dispersion of zinc oxide were added at 45° C. so that the amounts of dibenzoyl peroxide and zinc oxide became 0.3 part and 0.5 part, respectively, based on 100 parts of the solids content in the latex. Ion-exchanged water was further added to obtain a dip-forming composition with solids concentration of 30% and pH 10.

Except that the above dip-forming composition was used, a rubber glove was obtained by the same procedures as Example 1. Properties of this glove were measured and the results are shown in Table 2.

Example 7

In 39 parts of dibutyldiglycol adipate, 5 parts of dibenzoyl peroxide was dissolved at 45° C. To this solution, 44 parts of 1.7% aqueous solution of sodium dodecylbenzenesulfonate was added with stirring to obtain emulsion of dibenzoyl peroxide.

5 Parts of zinc oxide was dispersed in 5 parts of ion-exchanged water to obtain an aqueous dispersion of zinc oxide.

To conjugated diene rubber latex A, 5% aqueous solution of potassium hydroxide was added to adjust the pH to 10. To this latex the above-mentioned emulsion and the dispersion of zinc oxide were added at 45° C. so that the amounts of dibenzoyl peroxide and zinc oxide became 0.5 part and 0.5 part, respectively, based on 100 parts of the solids content in the latex. Ion-exchanged water was further added to obtain a dip-forming composition with solids concentration of 30% and pH 10.

Except that the above dip-forming composition was used, a rubber glove was obtained by the same procedures as Example 1. Properties of this glove were measured and the results are shown in Table 2.

TABLE 2

|  | Example | | |
| --- | --- | --- | --- |
|  | 5 | 6 | 7 |
| Formulated composition (part) | | | |
| Conjugated diene rubber latex | A | A | A |
| Solids content in latex | 100 | 100 | 100 |
| Organic peroxide | | | |
| benzoyl peroxide | 0.5 | 0.3 | 0.5 |

TABLE 2-continued

|  | Example | | |
|---|---|---|---|
|  | 5 | 6 | 7 |
| Organic solvent | | | |
| dibutyl phthalate | 4.3 | — | — |
| dibutylglycol adipate | — | 2.1 | 3.9 |
| Zinc oxide | — | 0.5 | 0.5 |
| Properties of dip-formed article | | | |
| 300%Md (MPa) | 1.6 | 2.4 | 2.5 |
| Tensile strength (MPa) | 24 | 25 | 26 |
| Elongation (%) | 750 | 680 | 710 |
| Color change by cupric ion | A | A | A |
| Resistance to flexing fatigue (hr) | $\geq 6$ | $\geq 6$ | $\geq 6$ |

Table 2 indicates the followings.

When a dip-forming composition of the present invention formulated with an organic peroxide dissolved in an organic solvent with a high boiling point, a rubber glove with well-balanced properties is obtained (Example 5).

When a dip-forming composition of the present invention formulated with an organic peroxide dissolved in an organic solvent with a high boiling point and zinc oxide, a rubber glove with well-balanced properties is obtained (Examples 6 and 7).

What is claimed is:

1. A glove obtained by dip-forming a composition obtained by adding a dibenzoyl peroxide to a conjugated diene rubber latex,
   wherein the conjugated diene rubber latex is obtained by emulsion polymerization of a monomeric mixture comprising 55 to 81 weight-% of a conjugated diene monomer, 2 to 8 weight-% of an ethylenically unsaturated acid monomer, and 11 to 43 weight-% of another monomer capable of copolymerization with these, using an inorganic peroxide as a polymerization initiator,
   wherein the concentration of solids content in the dip forming composition is 20 to 40 weight-%, and
   wherein the dip-forming composition contains neither sulfur nor curing accelerator.

2. The glove according to claim 1, wherein the dip-forming composition contains 0.01-5 parts by weight of the dibenzoyl peroxide based on 100 parts by weight of solids content in the conjugated diene rubber latex.

3. The glove according to claim 1, wherein zinc oxide is added at 2 parts or less by weight based on 100 parts by weight of solids content in the conjugated diene rubber latex.

4. The glove according to claim 1, wherein the other monomer capable of copolymerization with the conjugated diene monomer and the ethylenically unsaturated acid monomer is an aromatic vinyl monomer and/or an ethylenically unsaturated nitrile monomer.

* * * * *